United States Patent
Bekkevold et al.

(10) Patent No.: US 10,480,694 B2
(45) Date of Patent: Nov. 19, 2019

(54) CLAMP (71) Applicant: FMC Kongsberg Subsea AS, Kongsberg (NO)

(72) Inventors: Knut Håvard Bekkevold, Hof (NO); Morten Harm, Kongsberg (NO)

(73) Assignee: FMC Kongsberg Subsea AS, Kongsberg (NO)

(*) Notice: Subject to any disclaimer, the term of this patent is extended or adjusted under 35 U.S.C. 154(b) by 226 days.

(21) Appl. No.: 15/523,658

(22) PCT Filed: Oct. 29, 2015

(86) PCT No.: PCT/EP2015/075098
§ 371 (c)(1),
(2) Date: May 1, 2017

(87) PCT Pub. No.: WO2016/066740
PCT Pub. Date: May 6, 2016

(65) Prior Publication Data
US 2017/0314714 A1 Nov. 2, 2017

(30) Foreign Application Priority Data
Oct. 31, 2014 (NO) .................................. 20141297

(51) Int. Cl.
F16L 23/10 (2006.01)
E21B 17/06 (2006.01)
F16L 1/26 (2006.01)
E21B 33/038 (2006.01)

(52) U.S. Cl.
CPC .............. *F16L 23/10* (2013.01); *E21B 17/06* (2013.01); *E21B 33/038* (2013.01); *F16L 1/26* (2013.01)

(58) Field of Classification Search
CPC F16L 23/10; F16L 1/26; E21B 33/038; E21B 17/06
See application file for complete search history.

(56) References Cited

U.S. PATENT DOCUMENTS 4,309,049 A 1/1982 Chevallier
2014/0255090 A1 9/2014 Oravits et al.

FOREIGN PATENT DOCUMENTS

| EP | 0 202 805 A1 | 11/1986 |
| GB | 2 039 589 A | 8/1980 |
| GB | 2 128 701 A | 5/1984 |
| WO | WO 2005/116505 A1 | 12/2005 |

*Primary Examiner* — John C Hong (57) ABSTRACT

The invention concerns a clamp (1) for joining two connecting elements (2, 3) with abutting faces oriented transverse to a centre axis of the connecting elements. The clamp comprises a first and a second clamp element (4, 5) which are connected to each other by a pivot arrangement (6) and arranged for positioning around an area where the two connecting elements are to be joined. The clamp is provided with a locking device (9) to secure the connecting elements together when used, and the clamp is provided with an actuating device (10) which is arranged to actuate the locking device in between a locking position and a release position. The invention also concerns methods for releasing a clamp.

15 Claims, 3 Drawing Sheets

CLAMP

FIELD OF THE INVENTION

The invention relates to a clamp for joining two connecting elements, for instance a tubular element and an end cap, or two pipes, or a pipe and a manifold or X-mas tree. The invention also relates to an arrangement for closing a hub end and to methods for releasing the clamp.

One of the connecting elements may be a tubular element such as a hub, a flange of a pipe or another pipe-like element, such as a pipe end of a manifold, a X-mas tree bore or an end of a casing for a well which is installed before the X-mas tree is connected.

The other connecting element may comprise a tubular element such as a pipe, a hub of a pipe-like element or an end cap for closing off a tubular element. In one field of use, the end cap may be connected to a hub extending from a X-mas tree.

BACKGROUND OF THE INVENTION

The removal of clamps which are used subsea to join a connecting element such as an end cap to a tubular element such as hub is traditionally a time consuming and cumbersome procedure.

It is necessary to employ an ROV when retrieving the clamp subsea and removing the clamp from its installed position. The retrieval procedures also demand the use of complex and specialized tools to release and remove the clamp from engagement with the tubular element and the connecting element.

Prior art solutions include WO 2005/116505, which discloses a pipe clamp for connection of two pipes with hubbed end portions or one pipe and a pipe end cover.

The necessity of employing a specialized tool for each individual operation to be carried out, such as the retrieval of the clamp, means that the end user needs to invest in a variety of specialized tools. In addition to the obvious drawback of having to undertake the actual investment, there is also the need to carry out maintenance of all these tools.

Another challenge when connecting the clamp around a hub and an end closure is the issue of easily loosening and removing the clamp when it has been exposed to tension during connection and the multiple actions required to do so.

An object of the present invention is to provide arrangements which simplify the removal of the clamp. Another object is to reduce the retrieval time for retrieving the clamp from its installed position subsea to the surface of the water by, for instance, reduce the number of different actions required by an ROV.

SUMMARY OF THE INVENTION

The invention is set forth and characterized in the independent claims, while the dependent claims describe other characteristics of the invention.

The clamp in accordance with the invention proposes a simplified arrangement for the retrieval of the clamp which does not require a time-consuming and complex removal process.

Use of the inventive clamp does not require a dedicated retrieval tool; the ROV may employ a standard tool in order to carry out the removal process.

The arrangement of the clamp and the methods for releasing the clamp as defined in the independent claims enables a simplified release of the clamp by actuating means that are provided for easy handling by an ROV. Possible configurations of the clamp may also ensure that separation forces which act on the clamp during installation and subsequent pressurizing may be reduced.

The present invention concerns a clamp for joining two connecting elements with abutting faces oriented transverse to a centre axis of the connecting elements. The surfaces of the clamp which interact with the two connecting elements may have a different orientation than the abutting face of one of connecting elements. The clamp comprises first and second clamp elements which are connected by a pivot arrangement and configured for positioning around a joining area of the two connecting elements. The pivot arrangement provide the possibility of moving the ends of the two clamp elements distal to the pivot arrangement towards each other or away from each other. The pivot arrangement may comprise one hinge arrangement or two hinge arrangements and a further clamp element. The pivot arrangement provides the possibility of configuring a clamp with three or more clamp elements around a circumference.

The clamp is provided with a locking device which secures the two connecting elements together during use. The locking device ensures that the abutting faces of the connecting elements are assembled when the clamp is in its installed position around the two connecting elements. The locking device secures the two connecting elements together by closing the clamp, ensuring the two connecting elements are held together in a joined arrangement.

The locking device also provides a possibility to pre tension the clamp and the connecting elements in the installed position.

The clamp is also provided with an actuating device which is arranged to actuate the locking device between a locking position and a release position. The actuating device may have a fixed position relative to one of the clamp elements. The fixed position may be provided by a permanent or releasable attachment to the clamp element. The attachment may be pivotable relative to the clamp element, i.e., the actuating device may be hinged to the clamp element.

The actuating device and the locking device in a release position may be connected in a continuously linked arrangement with the clamp elements around the connecting elements. In the locking position the locking device is arranged to make contact with both clamp elements. In the release position the locking device is no longer in contact with both clamp elements. With the locking device in the release position, the clamp is ready to moved in an axial direction of the connecting elements, for instance when the connecting elements are a hub end and an end cap, for removal of the clamp from one of the connecting elements.

The actuating device and the locking device are provided as separate elements. The actuating device has an interface for controlling the operation of the actuating device and the locking device has another interface for controlling the specific operation of the locking device, such as the tensioning of the locking device. The two interfaces are distinctive for the specific operation of each of the actuating device and the locking device. However, the actuating device and the locking device are also arranged to interact with each other in certain operations, such as arranging the actuating device to actuate the locking device between the locking position and the release position. Other operations are specific to the device and will not be controlled by the operation of the other device, such as for instance the tensioning of the locking device.

In the locking position of the locking device, the actuating device and the locking device are connected with the clamp elements in a continuously linked arrangement around the connecting elements. In the locking position of the locking device, the locking device is in engagement with a locking portion of the clamp. Alternatively, the locking device in the locking position may be configured to be in engagement with two locking portions of the clamp. The locking device may be configured to be in engagement with the two clamp elements. In one aspect the locking device may be configured to be in engagement with locking portions provided on both the first and second clamp elements. In the release position the locking device only interacts with one clamp element. The engagement of the locking device with the locking portion of the clamp, or the locking portion of one clamp element, holds the clamp in position around the circumference of the two connecting elements until the locking device is brought to its release position by the actuating device.

In the release position of the locking device, the locking device is released from engagement with the locking portion of the clamp, and the clamp is thereby in an open position in which the continuously linked arrangement may be disconnected, allowing for the release of the clamp from the connecting elements in a direction transverse to a center axis of the clamp. The continuously linked arrangement may be configured for disconnection in the release position in various ways.

The continuously linked arrangement may be disconnected at the connection between the actuating device and the locking device. Another alternative is to disconnect the continuously linked arrangement by configuring the actuating device to be separated into two parts, or by arranging the locking device in a similar manner.

Another alternative disconnection arrangement involves providing a disconnection point in the connection between the locking device and one of the clamp elements or in the connection between the actuating device and one of the clamp elements. For actuation of the actuating device, the actuating device may have an attachment area for interaction with an ROV. This attachment area may also be an interface area. The actuating device may be operated by a standard torque tool, as the actuating device may be arranged to transform a rotational interaction with the ROV into a linear movement of a displaceable section of the actuating device. In an alternative embodiment the actuating device may be a hydraulic device or an electric device and the attachment area may comprise a coupling or an interface for attaching the ROV to provide a fluid or power to the actuating device. In all these instances standard ROV tools may be used.

The actuating device may be positioned on the clamp so that the attachment area is easily accessible by the ROV. For instance, the attachment area may be arranged on a portion of the clamp which is designated as a top portion of clamp when in the installed subsea position. In this installed position the clamp is positioned so that when brought into an open position, the opening between the two clamp elements faces downwards in the vertical direction, essentially towards the seabed. This position of the clamp provides easy access to the attachment area. When the actuation of the actuating device has been completed for releasing the clamp, the removal of the clamp may be carried out by lifting it in a mainly vertical direction.

The attachment area of the actuating device may be positioned at an end of the actuating device distal to the locking device. When the clamp is positioned as explained in the previously mentioned example, the end of the actuating device which is distal to the locking device is positioned at the top portion of the clamp. But the clamp may have other installation positions, for instance the connecting elements may be arranged so that their center axis is arranged mainly vertically.

The attachment area for interaction with an ROV may be used to control a displaceable section of the actuating device.

The locking device controls the opening and closing of the first and second clamp elements to and from a pre tensioned closed position of the clamp in which the locking device is engaged with the two clamp elements. The locking device may be connected to a first clamp element by a pivoting connection and have an abutment surface for engagement with a locking portion on the second clamp element. The locking device may comprise displaceable locking means to secure the connecting elements and bring the clamp elements into a pre tensioned locked position of the clamp. The displaceable locking means may be provided by a rotational arrangement such as, for instance, a threaded bolt engaged in a recess, or by other means capable of bringing the clamp into a pre tensioned state, such as a linear motor or a cylinder arrangement.

The actuating device which controls the movement of the locking device between the locking position and the release position may be configured in several ways to effect this movement.

The locking device may be moved from the locking position into the release position, when the locking device is in a tensioned state and the clamp is in a pre tensioned closed position, without first releasing the tensioned state of the locking device. Thus, bringing the locking device from the locking position to the release position by actuating the actuating device may be carried out directly without first operating the locking device such as, for instance, by repositioning the bolt in the recess.

In one embodiment the actuating device may be provided with a displaceable section to control the movement between the locking position and the release position of the locking device, for instance by moving the displaceable section. The actuating device may then be connected or linked in a fixed position to one clamp element, and movement of the displaceable section will also cause movement of the locking device between the locking position and the release position. The end of the displaceable section in this case provides a linear movement relative to the clamp element to which the actuating device is attached. The end of the displaceable section may alternatively effect a curved movement relative to the clamp element to which the actuating device is attached.

In a first actuating position of the displaceable section, the locking device may be configured to interact with the clamp elements in the locking position, and in a second actuating position of the displaceable section, the actuating device, or the movement of the actuating device to the second actuating position, is configured to cause the release of the locking device from the locking portion of the clamp. The actuating device may be connected to the locking device by a hinge arrangement so as to be able to move the locking device between the locking position and the release position by the movement of the displaceable section.

When the locking device is pivotally connected to the first clamp element, the actuating device may be configured to carry out an essentially linear movement to move the locking device between the locking position and the release position. The linear movement of the actuating device may be achieved in various ways, such as by movement of a displaceable section between an extended position and a retracted position. The displaceable section may be moved relative to a stationary section of the actuating device in a telescoping manner. The displaceable section may be moved relative to the stationary section by a screw connection in which threads on the displaceable section and the stationary section engage to carry out the movement.

The locking device is provided with displaceable locking means to move the clamp between an initial opening position of the clamp and a closed tensioned position of the clamp in which the two connecting elements, such as an end connecting element and a tubular element, are secured in a pre tensioned state. The displaceable locking means may also be configured so that the installation of the clamp to the connecting elements, normally done topside, is facilitated, for example by providing the displaceable locking means with a sufficient length to enable the abutment surface of the locking means to interact with the locking portion of the second clamp element while a certain opening exists between the clamp elements.

As mentioned above, the actuating device may be releasably connected to the locking device. The actuating device is then connected to the locking device in the locking position and is released from connection to the locking device in the release position of the locking device.

The releasable connection may be provided as a connection in which the relative position of the locking device with respect to the actuating device determines the release or connection of the actuating device from or to the locking device. The actuating device may then be provided with at least one surface which is configured to interact with at least one corresponding surface of the locking device in the locking position, and to be released from the corresponding surface of the locking device in an intermediate position of the actuating device.

Further, the at least one surface of the actuating device may be arranged as a part of a recessed end portion of the displaceable section, and the at least one surface of the locking device may be a part of a correspondingly shaped part of the locking device. The recessed end portion of the displaceable section may be configured to interlock with the correspondingly shaped part of the locking device when the angle between the actuating device and the locking device is larger than a predetermined release angle, and to release from the correspondingly shaped part of the locking device when the angle reaches the predetermined release angle.

As the skilled person will realize, the releasable connection between the locking device and the actuating device may be configured in several ways to be able to disconnect the actuating device from the locking device when the locking device is in the release position. If a full opening position of the clamp is to be achieved by other arrangements than the disconnection of the actuating device from the locking device, the connection between the locking device and the actuating device will in most circumstances be a fixed or permanent connection. In this case the connection will not be released but will be arranged to allow angular movement between the actuating device and the locking device.

The clamp may be used in an application where a connecting element such as an end cap is connected to a hub. In such an application the separation forces acting on the clamp when the end cap is installed and pressurized are considerable. To reduce the separation forces acting on the end cap, the interior surface of the clamp facing the connecting element may have a radial contact surface oriented essentially perpendicular to the centre axis of clamp. The interior surface of the clamp facing the hub may have a contact surface which is oriented essentially inclined with an angle of about 65 degrees to the centre axis of clamp. This orientation of the inclined surface preloads a seal element positioned at the connection area of the hub and the end cap.

Thus, the interior surface of the clamp facing the hub has a configuration which differs from the configuration of the interior surface of the clamp facing the end cap.

The invention also concerns a method for releasing a clamp as described above, wherein the method comprises the following steps:
  moving a displaceable section of the actuating device from a first actuating position to a second actuating position, thereby causing the locking device to move out of engagement with a locking portion of the clamp, and
  disconnecting the continuously linked arrangement made up by the clamp elements, the actuating device and the locking device to an open position, such that the clamp may be removed from one of the connecting elements in a direction transverse to a centre axis of the one connecting element.

The invention also concerns an additional method for releasing a clamp as described above, wherein the method comprises the following steps:
  moving a displaceable section of the actuating device from a first actuating position to a second actuating position, thereby causing the locking device to move out of engagement with a locking portion of the clamp, and
  removing the clamp from the one connecting element by moving the clamp away from the one connecting element in a longitudinal direction of the one connecting element.

The invention will now be described by an example of a non-limiting embodiment and with reference to the attached drawings, wherein:

DETAILED DESCRIPTION OF THE INVENTION

Figure 1A:
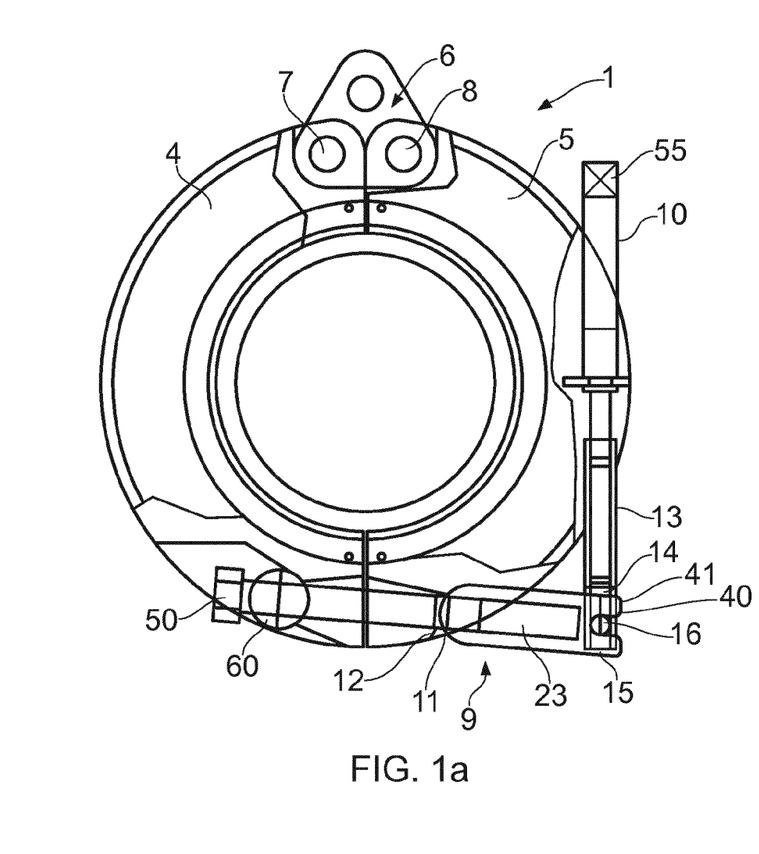
FIG. 1a is a front view of an embodiment of the clamp in accordance with the invention, where the clamp is positioned in a closed position.
Figure 1B:
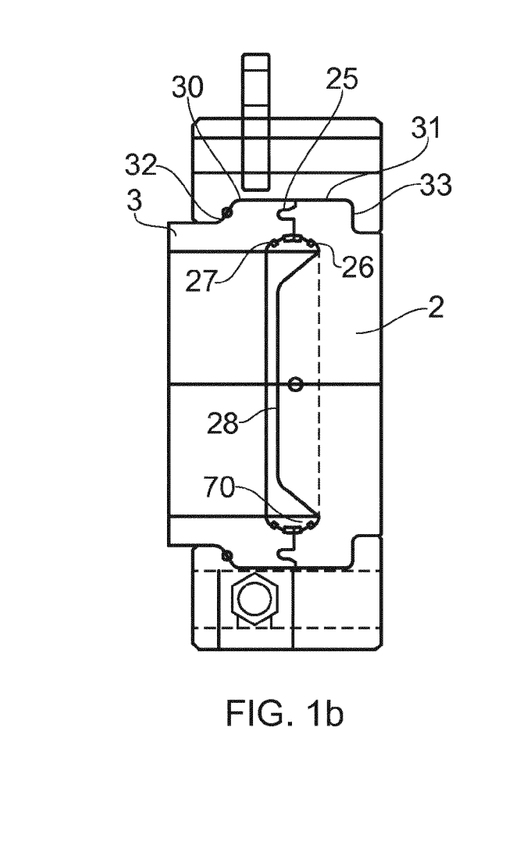
FIG. 1b is a cross section through an axial plane of the clamp in FIG. 1a, with the addition of a seal element, an end cap and a hub.

FIGS. 1a and 1b show an embodiment of a clamp 1 for joining two connecting elements. The two connecting elements in this example are shown to be an end cap 2 which is joined to a tubular element, such as a hub 3. The first or second connecting elements may also be a flanged end of a pipe, a hub on a template or a Christmas tree, or any other element. The clamp 1 comprises first and second clamp elements 4, 5, but the clamp may also under some circumstances comprise three or more clamp elements. The clamp elements 4, 5 are connected by a pivot arrangement 6 provided at first end portions of the clamp elements. The pivot arrangement may also comprise additional clamp elements, and the clamp may then comprise more than two clamp elements as mentioned above. The installment or the retrieval of the clamp around the circumference of the connecting elements, or the hub and the end cap, is carried out by pivoting the clamp elements relative each other in order to open and close the clamp 1. One possible way of providing this movement is to allow the first clamp element 4 to pivot around a pivot axis 7, whereas the second clamp element 5 is arranged to pivot around a pivot axis 8. In the illustrated embodiment, both the axes are arranged in the pivot arrangement 6. Another possibility is to allow the clamp elements to pivot around a common pivoting axis included in the pivot arrangement, or to join the two clamp elements around a common pivoting axis, such as in a hinged connection. In such an embodiment the pivot arrangement 6 may still be present or it may be omitted. These rotation axes or pivot axes are preferably oriented mainly parallel to a center axis of the clamp, and thus also to a center axis of the connecting elements, or to a joining area of the connecting elements.

A locking device 9 is connected to the clamp 1 at second end portions of the clamp elements. As shown in FIGS. 1*a* and 1 *b*, the locking device 9 is positioned opposite the location of the pivot arrangement 6. In the illustrated embodiment, the locking device 9 is positioned at a lower portion of the clamp (as viewed in the figures), and the pivot arrangement 6 is arranged at a top portion of the clamp. However, when the clamp is used subsea, this orientation may be as shown or it may be different, as the orientation of the clamp may vary. For instance, a center axis of the clamp may be arranged in a mainly vertical direction or in another angular direction, and the opening may face a direction different from the downwards facing opening.

The locking device 9 controls the locking of the clamp. The pre tensioning of the clamp around the connecting elements is adjusted by the locking device 9. The locking device 9 in the illustrated embodiment is connected to the first clamp element 4 by a pivot connection 60 and has an abutment surface 11 for engagement with a locking portion 12 provided on the second clamp element 5. The shapes of the abutment surface 11 and the locking portion 12 may vary depending on the configuration of the clamp and will be discussed further below.

Figure 2:
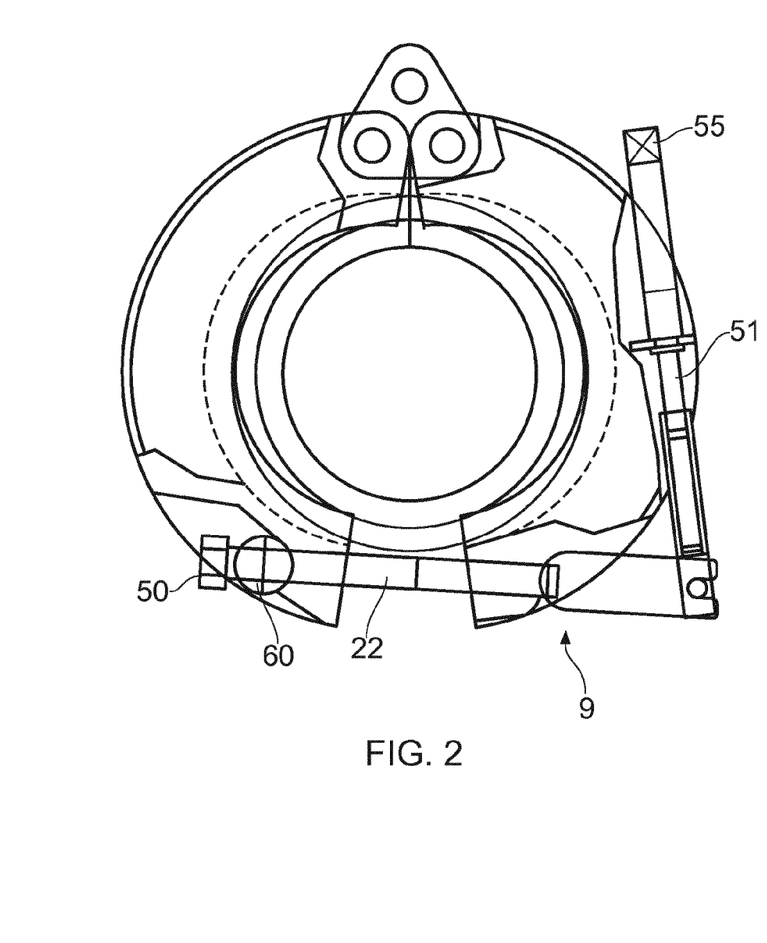
FIG. 2 is a front view of the clamp in FIG. 1a, showing a sequence of an installation procedure where the locking means are interacting with a locking portion of a clamp element.

In this embodiment of the invention an actuating device 10 is attached to the second clamp element 5. The actuating device 10 in the illustrated embodiment is attached in a fixed position relative to the clamp element. The fixed position may be provided by a permanent or a releasable attachment. The attachment may also be configured to be pivotable relative to the clamp element, i.e., the actuating device may be hinged to the clamp element. The actuating device 10 has a displaceable section 13 which is configured for connection with the locking device 9. As shown in the figures, an end portion 14 of the displaceable section 13 has a recessed configuration with two separate passages 17, 18 divided by a guide element 16. An end portion 15 of the locking device 9 has a recess 19 for the accommodation of the guide element 16 when connecting the end portion to the end section 14 of the displaceable section 13. First and second engagement portions 20, 21 surrounding the recess 19 are accommodated in the passages 17, 18 on the sides of the guide element 16 when the actuating device 10 is connected to the locking device 9, as shown in FIGS. 1*b* and 2.

The end portion 14 of the displaceable section 13 may have a different configuration, such as, for instance, a pin-like element with a cross element attached to it, where the cross element constitutes the guide element 16 and the recessed configuration constitute the passages 17,18 which are formed by the spaces around the pin-like element and the cross element.

Alternatively, the end portion 14 may be formed with a triangular shaped element, where one side forms the guide element 16, and the interior of the triangle and the space outside of the guide element 16 provide the recessed configuration making up the passages 17,18. However, in all these embodiments the end portion 14 of the displaceable section 13 is arranged for connection with the locking device 9, and the locking device has a corresponding shape. These corresponding shapes allow the locking device 9 to be connected to the actuating device 10 when the angle between the actuating device and the locking device is larger than a predetermined release angle, and to be released from the actuating device when the angle reaches the predetermined release angle.

Figure 4:
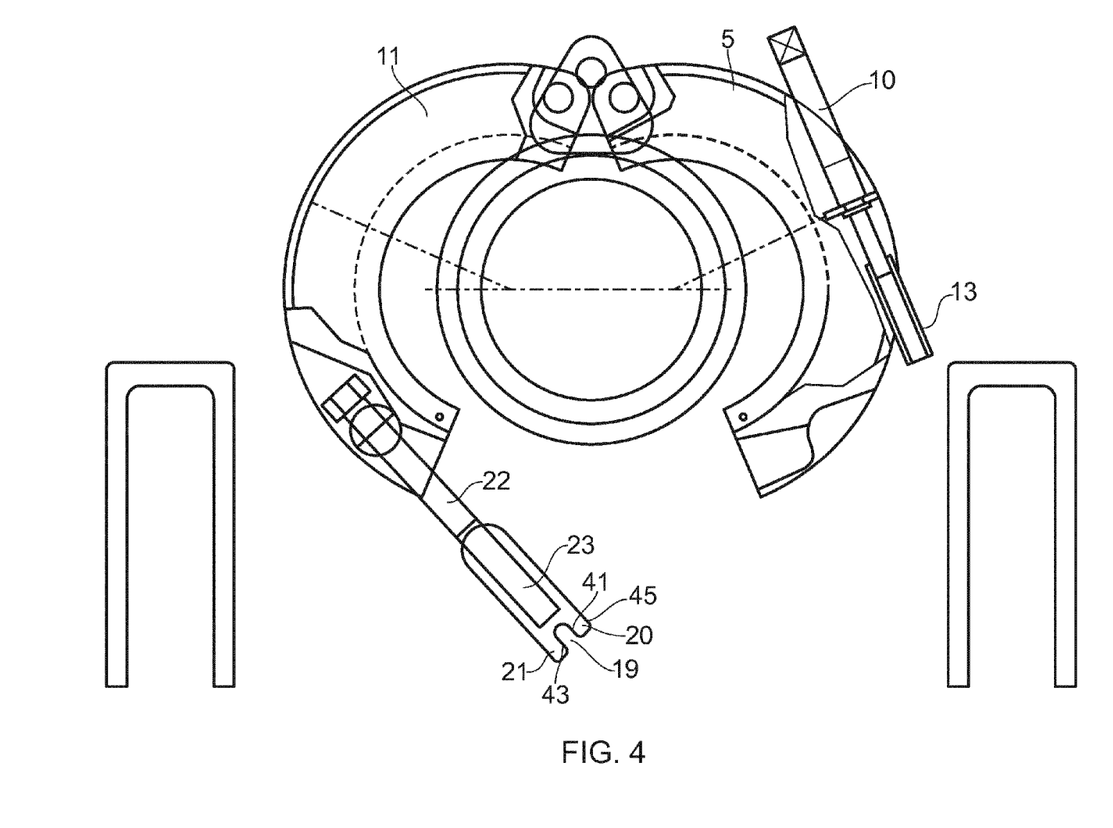
FIG. 4. is a front view of the clamp in FIG. 1a, where the clamp is in a release position in which the continuously linked arrangement also is released.

In the embodiment shown in the figures, displaceable locking means of locking device 9 comprises a bolt 22 with threads which is inserted into a receiving recess 23 with corresponding internal threads (FIG. 4). In FIG. 1*a* the bolt 22 is screwed into the receiving recess 23 and arranged in an accommodated position with the abutting surface 11 acting against the locking portion 12, so that the locking device is in a tensioned state and a clamping force works on the interacting connecting elements, namely, the end cap 2, the hub end 3 and a seal element 70, as shown in FIG. 1*b*.

The locking device 9 may be arranged with means other than a bolt 22 for carrying out the tensioning of the locking device in the locked position. Several means able to carry out a mainly linear movement may be used, such as, for instance, a device with a linear motor, a piston arrangement, etc.

As shown in FIG. 1*b*, in a connected position the first connecting element 2 is positioned in contact with the second connecting element 3 using corresponding alignment means 25 arranged to enable the correct position of the first connecting element 2 with the second connecting element 3 before securing the clamp in a closed and tensioned position. The first connecting element 2 and the second connecting element 3 have opposite angled contact areas 26, 27, forming recesses arranged for abutting against the seal element 70. The seal element 70 is positioned in the inner recesses 26, 27 to seal the contact surfaces of the connection between the first connecting element 2 and the second connecting element 3. The seal element 70 is formed as an annular ring, possibly a metal annular ring, positioned partly within the end cap 2 and the hub 3. The contact surfaces between the seal, i.e., the annular ring and the first and second connecting elements, form sealing surfaces. There may be one sealing surface with each connecting element or more than one sealing surface, depending on the configuration of the annular seal element and the recesses. In another embodiment a seal with additional sealing elements may be provided in this contact surface, or an annular plug element may be positioned between the two connecting elements. The end cap 2 in FIG. 1*b* is positioned to close off and hold inner pressure within the tubular void of the hub 3 and is formed with a thickened portion having a surface 28 extending into the interior void formed by the annular seal element 70 and the hub 3.

As seen in FIG. 1b, a portion 30 of the interior surface of the clamp 1 facing the connecting element 2 has a radially oriented surface 33 which faces the connecting element 2. The radial surface 33 is oriented essentially perpendicular to a centre axis of the clamp. The orientation of this interface between the clamp 1 and the connection element 2 reduces the separation forces when the connection element 2 is installed and pressurized. The portion 30 of the interior surface of the clamp 1 facing the tubular element 3 has a further a contact surface 32 which is oriented essentially inclined with an angle of about 65 degrees to the centre axis of clamp. This inclined contact surface 32 is in contact with the hub 3 when the clamp is in the installed position. By this angular orientation of the contact surface 32, the clamping force of the clamp in the tensioned closed position preloads the seal element 70.

As mentioned above, the clamp as shown in FIG. 1a is in a closed tensioned state. The locking device 9 is hinged with the first clamp element 4 and arranged in abutment with the second clamp element 5 in its tensioned state to thereby provide a pretension on the clamp. In the position shown on FIG. 1a, the guide element 16 of the displaceable section 13 of the actuating device 10 is positioned in the recess 19 of the locking device 9 as long as the clamp elements, the actuating device and the locking device are connected in a continuously linked arrangement. At least one surface 40 of the guide element 16 is arranged in contact with at least one surface 41 of the recess 19 when maintaining the connection making up the continuously linked arrangement.

In the locked position of the clamp, the abutment surface 11 interacts with the locking portion 12. The locking portion 12 of the one clamp element may be shaped with a stopping area. The abutment surface 11 of the locking device is moved over the stopping area and out of engagement with the locking portion 12 when moving the locking device from the locked position to the release position. The locking portion 12 has a curved configuration in which the stopping area is located at the top of the curved configuration to provide an obstruction to the abutment surface, which is positioned in the valley/bottom area of the curved configuration when in the locked position of the locking device. When releasing the locking device it is necessary to move the abutment surface 11 over the stopping area in order to release the locking device from engagement with the locking portion 12. In such a configuration of the abutment surface 11 and the locking portion 12, the actuating device 10 may be removed from the clamp after the clamp is pre tensioned and then installed on the clamp when the clamp is to be released. The distance between the bottom surface and the top surface of the curved configuration may vary.

In another embodiment the locking portion 12 may comprise a mainly flat surface. This provides the possibility of shaping the end portion 14 of the displaceable section 13 of the actuating device 10 and the end portion 15 of the locking device in different manners depending on whether the actuating device should both push and pull the locking device, and to what degree, or only push or only pull the locking device.

The locking device is arranged to be pre tensioned or released from pretension by connecting an ROV to the head 50 of the bolt 22 and subsequently rotating the bolt in the recess 23. FIG. 2 shows a possible position during installation of the clamp. When installing the clamp it is usually made up topside before deployment in the sea, and other tools to rotate this bolt 22 may be used. By repositioning the bolt 22, the tension of the locking device 9 is adjusted and the first and second clamp elements 4, 5 are caused to pivot around their pivot axes 7,8, thereby regulating the pretension of the clamp. FIG. 2 shows the position of the bolt 22 during installation and FIG. 1a shows the position of the bolt 22 in the installed position of the clamp.

When the locking device 9 is in the locking position, the actuating device 10 and the locking device 9 are connected with the clamp elements 4, 5 in a continuously linked arrangement around the circumference of the two connecting elements, such as the end cap 2 and the hub 3.

Figure 3:
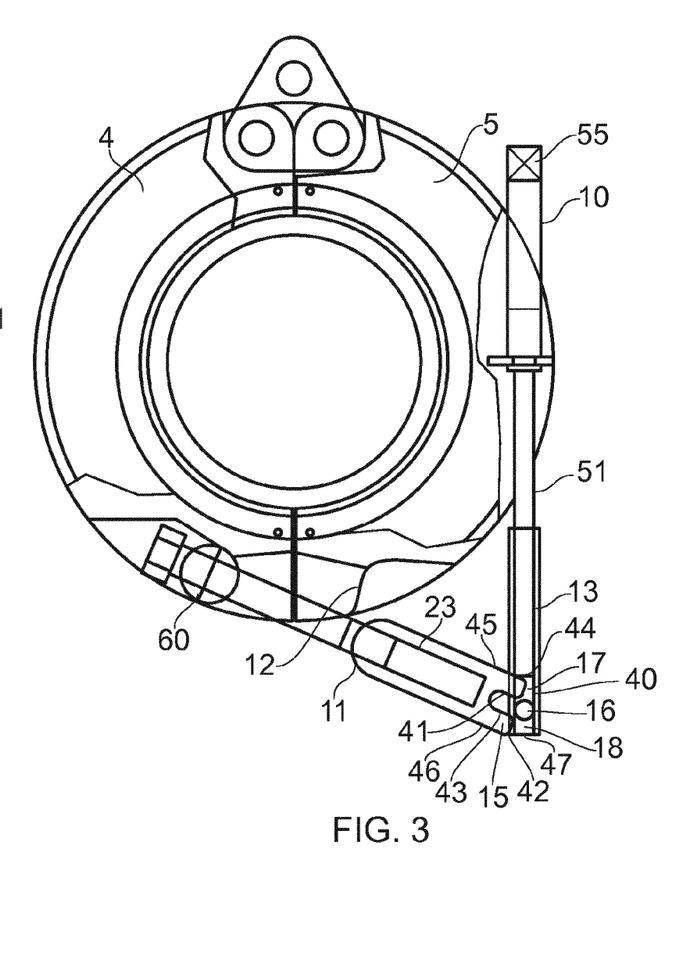
FIG. 3. is a front view of the clamp in FIG. 1a, where the clamp is in a release position in which the locking means are released from a locking portion of a clamp element and the clamp forms a continuously linked arrangement around the connecting elements.

In order to release the clamp 1 from the connecting elements, the locking device 9 is released from engagement with the locking portion 12. The release of the locking device 9 is achieved by moving the displaceable section 13 of the actuating device 10 from a first actuating position shown in FIG. 1a to a second actuating position shown in FIG. 3, thereby moving the locking device 9 with the abutment surface 11 out of engagement with the locking portion 12, and at the same time pivoting the first and second clamp element 4, 5, as shown in FIG. 3. It is therefore possible to release the clamp without releasing the pretension of the clamp by adjusting the tension of the locking device. Only interaction between the actuating device and the locking devices is needed to release the clamp from the connecting devices 2, 3.

The actuating device 10 has an attachment area 55 for interaction with an ROV for controlling the actuating device 10 and moving the displaceable section 13 of the actuating device 10 to release the locking device.

The attachment area 55 of the actuating device 10 is easily accessible by the ROV. The attachment area 55 may be positioned at an end of the actuating device which is distal relative to the locking device.

The displaceable section 13 may be connected in a telescoping manner to a stationary section 51 of the actuating device. The displaceable section 13 may be configured as a bolt element having internal threads which is arranged to interact with a stationary section 51 configured as a bolt element having external threads.

FIG. 3 shows the displaceable section 13 moved to a second actuating position in which the locking device 9 and the actuating device 10 have been disconnected, or to a position where they may be disconnected and connected. The disconnection occurs in a release position of the locking device 9. In the example shown in FIG. 3, the release of the actuating device 10 from the locking device 9 is about the happen.

When starting in the first actuating position of the actuating device 10, as shown in FIG. 1a, the movement of the displaceable section 13 first moves the locking device 9 out of locking engagement with the locking portion 12, and then continued movement of the displaceable section 13 causes a disconnection of the continuously linked arrangement.

When the clamp elements, the locking device and the actuating device are connected in the continuously linked arrangement, and the connection between the actuating device and the locking device is given a suitable configuration, it may be possible to release the clamp from the connecting element, for instance the hub 3, by moving the clamp in a direction along the center axis of the clamp and the hub without disconnecting the continuously linked arrangement.

In the illustrated embodiment the disconnection of the continuously linked arrangement is carried out by the disconnection of actuating device 10 from the locking device 9 by releasing the guide element 16 from engagement with the recess 19. The disconnection of the actuating device 10 from the locking device 9 occurs when the angle between the actuating device and the locking device reaches a predetermined release angle. When moving the displaceable section 13 from the first actuating position shown in FIG. 1a into the second actuating position shown in FIG. 3, the essentially rectilinear movement of the displaceable section 13 causes the locking device 9 to pivot about the pivot connection 60 until the predetermined release angle is reached and the disconnection between the actuating device and the locking device 9 occurs. The movement of the displaceable section 13 is transferred to the locking device 9 by the engagement between the various surfaces 40, 42, 44, 47 of the passages 17, 18 and the guide element 16 of the end portion 14 and the contact surfaces 41, 43, 45, 46 of the first engagement portion 20, the second engagement portion 21 and the recess 19 of the end portion 15.

The disconnection of the locking device 9 from the actuating device 10 introduces a disconnection of the continuously linked arrangement, and this enables the first and second clamp elements 4, 5 to pivot into a clamp opening position, as seen in FIG. 4, which allows for the release of the clamp 1 from the connecting elements 2, 3 in a direction transverse to a center axis of the clamp.

When assembling the first and second clamp elements 4,5 to install the clamp 1 around the circumference of the connecting elements 2, 3, the first and second clamp elements are first pivoted into a position where the clamp is positioned around the connecting elements, as shown in FIG. 3. The displaceable section 13 is arranged in a second actuating position for connection to the locking device 9. The displaceable section 13 of the actuating device is then retracted into a first actuating position, thereby moving the locking device 9 into engagement with the locking portion 12 of the clamp, as shown in FIG. 2. Moving the locking device 9 into the locking position causes the clamp elements to pivot into a position where the clamp has an initial or preliminary opening, as shown in FIG. 2.

The locking device 9 is then tensioned by moving the bolt 22 further into the recess, thereby pivoting the clamp elements 4, 5 into the tensioned closed position of the clamp, as shown in FIG. 1a.

The invention is herein described in non-limiting embodiments. A skilled person in the art will understand that alterations and modifications to the embodiments may be made that are within the scope of the invention as defined in the attached claims.

The invention claimed is:

1. A clamp for joining two connecting elements having abutting faces oriented transverse to a centre axis of the connecting elements, the clamp comprising:
   first and second clamp elements which are connected to each other by a pivot arrangement and are configured to be positioned around an area where the two connecting elements are joined;
   a locking device for securing the connecting elements together; and
   an actuating device which is configured to actuate the locking device between a locking position and a release position;
   wherein in the locking position the locking device is in contact with the first clamp element and the second clamp element, and in the release position the locking device is in contact with only one of the first clamp element and the second clamp element; and
   wherein in the release position the actuating device and the locking device are connected with the first and second clamp elements in a continuously linked arrangement around the connecting elements.

2. The clamp in accordance with claim 1, wherein the continuously linked arrangement is configured to be disconnected in the release position to thereby define a clamp opening position for the release of the clamp from the connecting elements in a direction transverse to a centre axis of the clamp.

3. The clamp in accordance with claim 2, wherein the actuating device has a displaceable section, and wherein in a first actuating position of the displaceable section the locking device is in the locking position, in a second actuating position of the displaceable section the locking device is released from a locking portion of the clamp, and in a third actuation position of the displaceable section the continuously linked arrangement is disconnected.

4. The clamp in accordance with claim 3, wherein the actuating device is connected in a fixed position to one of the first and second clamp elements, a first end of the actuating device is configured move linearly when the actuating device is actuated, the first end of the actuating device is linked with a first end of the locking device, and the locking device is hinged to the other of the first and second clamp elements.

5. The clamp in accordance with claim 4, wherein in the locking position at least a first surface of the actuating device is configured to interact in engagement with at least a first corresponding surface of the locking device, and in the release position the first surface of the actuating device is released from the first surface of the locking device to thereby disconnect the continuously linked arrangement of the clamp.

6. The clamp in accordance with claim 5, wherein the first surface of the locking device forms a recessed end portion, and wherein the first surface of the actuating device is formed on the displaceable section and is shaped to interlock with the recessed end portion when an angle between the actuating device and the locking device is larger than a predetermined release angle and to release from the recessed end portion when the angle reaches the predetermined release angle.

7. The clamp in accordance with claim 1, wherein the locking device is pivotally connected to the first clamp element and comprises an abutment surface which is configured to engage a locking portion surface on the second clamp element.

8. The clamp in accordance with claim 1, wherein the clamp comprises an interior surface facing the connecting elements which is formed with different profiles for each of the two connecting elements.

9. The clamp in accordance with claim 8, wherein the interior surface of the clamp facing the first connecting element has a first contact surface which is oriented at an angle of 90 degrees relative to the centre axis of the clamp.

10. The clamp in accordance with claim 9, wherein the interior surface of the clamp facing the second connecting element has a second contact surface which is oriented at an angle other than 90 degrees relative to the centre axis of the clamp.

11. The clamp in accordance with claim 1, wherein the locking device comprises a displaceable locking means to secure the connecting elements and pretension the clamp.

12. The clamp in accordance with claim 1, wherein the actuating device comprises an attachment area for a separate operation device which controls the actuation of the displaceable section of the actuating device.

13. A method for releasing a clamp from engagement with two connecting elements having abutting faces oriented transverse to a centre axis of the connecting elements, the clamp comprising first and second clamping elements which are connected together by a pivot arrangement and are configured to be positioned around an area where the connecting elements are joined, a locking device for securing the connecting elements together, and an actuating device for actuating the locking device, the method comprising:

bringing the clamp from a locking position, in which the locking device is in contact with the first clamp element and the second clamp element, to a release position, in which the locking device is in contact with only one of the first clamp element and the second clamp element, while maintaining a continuously linked arrangement made up by the clamp elements, the actuating device and the locking device.

14. The method according to claim 13, further comprising:

moving a displaceable section of the actuating device from a first actuating position to a second actuating position, thereby causing the locking device to move out of engagement with a locking portion of the clamp; and when in the release position, disconnecting the continuously linked arrangement such that the clamp may be removed from the connecting elements in a direction transverse to a centre axis of at least one of the connecting elements.

15. The method according to claim 13, further comprising:

moving a displaceable section of the actuating device from a first actuating position to a second actuating position, thereby causing the locking device to move out of engagement with a locking portion of the clamp; and when in the release position, removing the clamp from at least one of the connecting elements by moving the clamp in a longitudinally in a direction away from at least one of the connecting elements.

* * * * *